Sept. 3, 1929.   C. R. BUTLER   1,727,098
MICRO ADJUSTING DEVICE
Filed Nov. 18, 1922
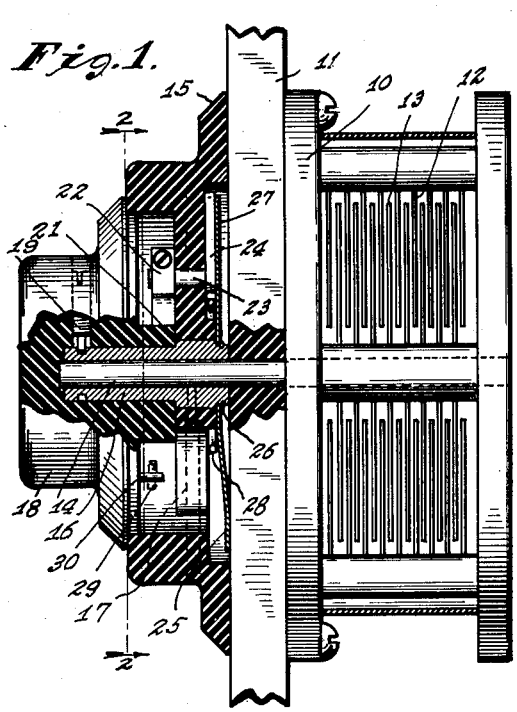
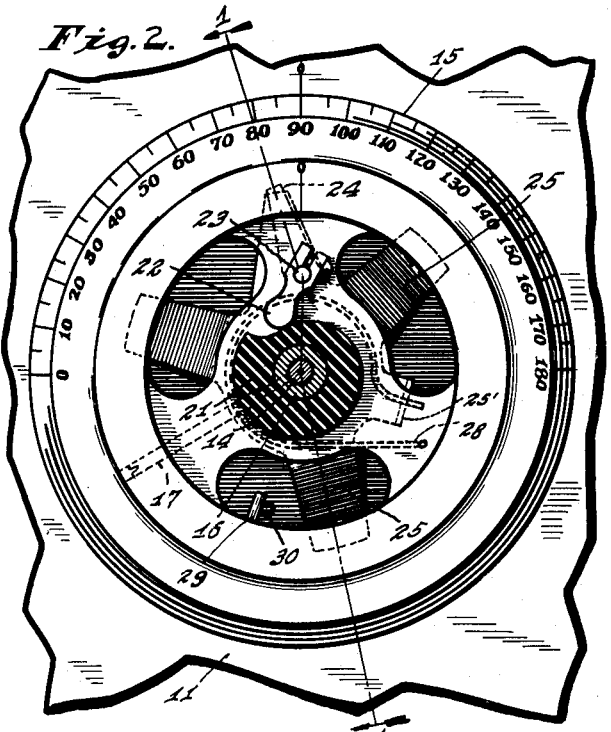
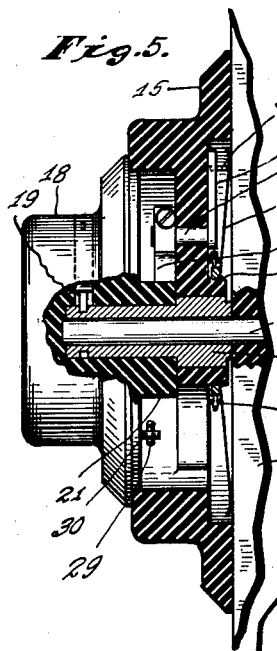
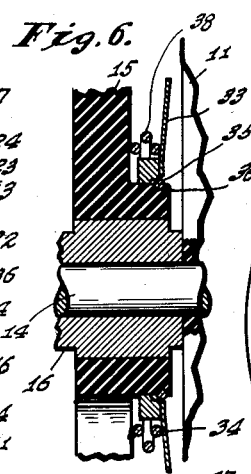
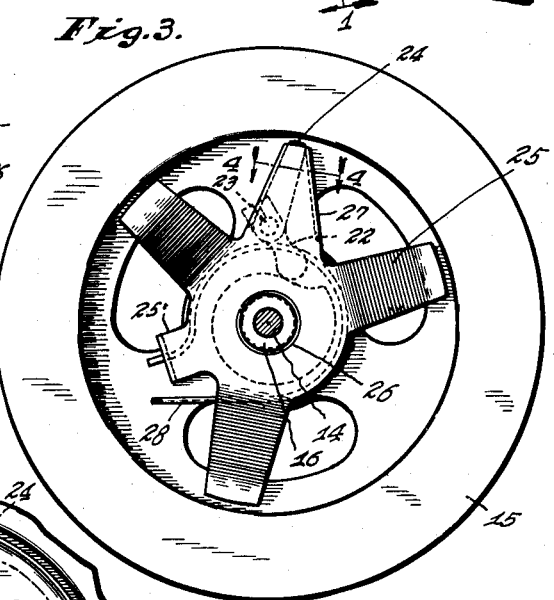
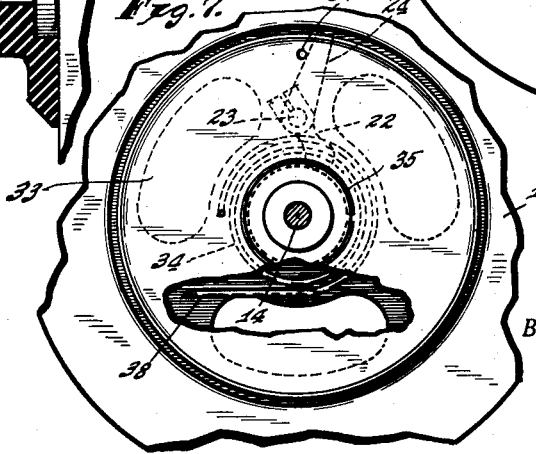
INVENTOR.
Charles R. Butler,
BY
ATTORNEY.

Patented Sept. 3, 1929.

1,727,098

UNITED STATES PATENT OFFICE.

CHARLES R. BUTLER, OF INDIANAPOLIS, INDIANA.

MICROADJUSTING DEVICE.

Application filed November 18, 1922. Serial No. 601,903.

It is the object of my invention to provide a simple and effective adjusting device for readily getting both coarse and fine angular adjustments of a shaft, to get both adjustments without lost motion, and to get these results by a device which is inexpensive to manufacture and which is smooth in operation.

In carrying out my invention I provide two concentric adjusting members, one of which is rigid with the shaft to be adjusted and the other of which carries a cam, and I provide means operated by the cam to vary the position of the member rigid with the shaft relative to a third member, such third member being spring-pressed against a stationary part so that it may remain stationary during adjustment of the shaft by the cam-carrying member but may turn with the shaft during adjustment by the other adjusting member.

I have illustrated my invention in connection with a variable condenser of the type much used in radio receiving sets; but my adjusting mechanism is capable of many other uses.

The accompanying drawing illustrates my invention: Fig. 1 is a side elevation in partial section on the line 1—1 of Fig. 2, showing my device applied to a condenser mounted on the usual panel of a radio receiving set; Fig. 2 is a front elevation in partial section on the line 2—2 of Fig. 1; Fig. 3 is a rear elevation, with the shaft in section; Fig. 4 is a section on the line 4—4 of Fig. 3; Fig. 5 is a section similar to Fig. 1, showing a modification; Fig. 6 is an enlarged view of the central portion of Fig. 5; and Fig. 7 is a rear elevation of the modification of Fig. 5.

The variable condenser 10, in connection with which I have shown my invention, may be mounted upon a panel board 11. This condenser has the usual stationary plates 12 and movable plates 13, the latter being mounted on a shaft 14.

A graduated disk 15, having a hub 16, is fixed on the shaft, as by a set-screw 17. A knob 18 is loosely mounted on the hub 16 and is capable of rotary movement relative thereto but prevented from longitudinal movement by a screw 19, the end of which fits in an annular groove in the hub 16. The disk 15 is manipulated for coarse adjustment, and the knob 18 for fine adjustment.

A cam 21, rigid with the knob 18, as by being molded integral therewith, projects into a circular recess in the outer face of the disk 15, in position to operate a cam-follower 22. The cam is shown as a spiral cam, in a single plane, as I find that a most convenient form; but my invention is not limited to that form of cam. The cam-follower 22 is clamped, or otherwise fixed, to one end of a short shaft 23, displaced from but parallel to the main shaft 14 of the condenser and carried by and extending through the disk 15, and having an arm 24 on its other end. Thus the cam-follower 22, shaft 23, and arm 24 constitute a bell-crank in which the two arms lie in separate parallel planes.

Now referring specifically to the arrangement shown in Figs. 1 to 4 inclusive, a spider 25 of spring material is mounted on the inner end of the hub 16 and is free to rotate relatively thereto. I preferably provide a groove on the inner end of the hub 16 into which may be snapped a spring-wire ring 26, to hold the spider 25 in place relative to the disk 15 when the device as a whole is not mounted on the shaft 14; but the spring-wire ring is not at all essential to the operation of the device. The spider 25 shown is provided with three legs which bear against the face of a stationary member, such as the panel board 11, but the number of legs is of course immaterial. The spider is also provided with a triangular shaped arm 27, the flaring edges of which are bent to extend on both sides of the arm 24. I prefer to bevel the sides of the arm 24 and bend the edges of the arm 27 to fit this bevel as shown in Fig. 4, in order to counteract any tendency of the arm 27 to ride over the arm 24. The outer end of the arm 24 has a fulcrum in the narrow outer end of the arm 27, and the flare of the sides of the arm 27 permits the arm 24 to swing therein about such fulcrum. A spring 28 has one end bent laterally and inserted in a hole in the disk 15. From this point the spring encircles the shaft 14, and at its other end extends through a hole in an arm 25' of the spider 25. This spring serves to hold the cam follower 22 against the cam 21, as its action is transmitted through the spider 25, arm 24, and shaft 23 to the cam follower 22. As shown in Fig. 2, this spring tends to turn the spider counter-clockwise relatively to the disk 15. As the spring holds the cam follower in contact with the cam at all times, there can be no lost motion in the operation of my invention. This particular form of spring is not essential to my invention, and any spring serving the same purpose may be substituted therefor.

I provide a stop pin 29 on the disk 15 and a co-operating stop pin 30 on the knob 18. These pins are so located relative to the disk and knob that they prevent turning of the knob relative to the disk past the point where the cam follower would drop from the higher part of the cam to the lower part.

In the modification of my device shown in Figs. 5, 6, and 7, I provide instead of the spider 25 a disk 33 spring-pressed at its edge against a stationary member, such as the panel board 11, as by means of a coil spring 34. As in the case of the spider previously described, I prefer to retain this disk in place against the spring pressure behind it by means of a spring-wire ring 35 fitting in a groove in a shoulder 36 of the operating disk 15. A pin 37 projecting eccentrically from the disk 33 is pressed against the lever 24 by a spring 38, which operates in substantially the same way as does the spring 28 shown in Fig. 2.

In operation, the condenser or other piece of apparatus to which my device is attached, is given a coarse adjustment by turning the operating disk 15 to the approximate location desired. This moves the shaft 14 and its carried parts through the same angle as the disk 15. By reason of its connection with the operating disk 15, the spider 25 or spring-backed disk 33 is rotated therewith and slid on the face of the panel board 11. When it is desired to obtain a fine adjustment, the knob 18 is turned. This rotation of the knob 18 turns the cam 21, which is rigid therewith, and the cam 21 causes a slight rotation of the cam follower 22 and the lever 24 about the axis of the shaft 23. Due to the fact that it is pressed against the stationary panel board 11, the spider 25 or spring-backed disk 33 now remains stationary, and so provides a stationary fulcrum for the outer end of the lever 24, which results in a movement of the shaft 23 about the shaft 14. As the shaft 23 is carried by the disk 15, there results a turning of such disk and of the shaft 14 and its carried parts, but through a very slight angle compared to that through which the knob moves. By varying the pitch of the cam and the length of the cam follower 22 and lever 24, I can obtain any desired ratio of angular velocities between the shaft 14 and the knob 18.

I claim as my invention:

1. In combination, an operating shaft for an adjustable device, an adjusting member fixed on said shaft for adjusting it, a second adjusting member co-axial with said first adjusting member and rotatable relatively thereto, a cam operated by said second adjusting member, and means co-operating with said cam when said second adjusting member is rotated to cause rotation of said operating shaft through a smaller angle than that through which said second adjusting member is turned.

2. In combination, an operating shaft for an adjustable device, an adjusting member for adjusting said shaft, a second adjusting member co-axial with said first adjusting member and rotatable relatively thereto, a cam operated by said second adjusting member, and means co-operating with said cam when said second adjusting member is rotated to cause rotation of said operating shaft.

3. In combination, an operating shaft for an adjustable device, an adjusting member fixed on said shaft for adjusting it, a second adjusting member co-axial with said first adjusting member and rotatable relatively thereto, said second adjusting member being provided with a cam, and means operated by said cam upon the rotation of said second adjusting member to cause rotation of said operating shaft through a smaller angle than that through which said second adjusting member is turned.

4. In combination, an operating shaft for an adjustable device, an adjusting member for adjusting said shaft, a second adjusting member co-axial with said first adjusting member and rotatable relatively thereto, said second adjusting member provided with a cam, and means operated by said cam upon the rotation of said second adjusting member to cause rotation of said operating shaft.

5. In combination, an operating shaft for an adjustable device, a member fixed to said shaft for adjusting it, a second adjusting member co-axial with said shaft and capable of rotation relative thereto, said second adjusting member being provided with a spiral cam, and a bell-crank pivoted on said first adjusting member and having one of its arms arranged to engage said cam, and means tending to hold stationary the end of the other arm of said bell-crank.

6. In combination, an operating shaft for an adjustable device, a stationary member, an adjusting member fixed on said shaft, a second adjusting member co-axial with said shaft and capable of rotation relative thereto, said second adjusting member being provided with a cam, a member carried by said first adjusting member and spring-pressed against said stationary member, and means operated by said cam to cause relative rotation of said first adjusting member and said spring-pressed member when said second adjusting member is turned relative to said first adjusting member.

7. In combination, an operating shaft for an adjustable device, a stationary member, an adjusting member fixed on said shaft, a second adjusting member co-axial with said shaft and capable of rotation relative thereto, said second adjusting member being provided with a cam, a bell-crank pivotally mounted on said first adjusting member and having one of its arms arranged to bear against said cam, a member carried by said first adjusting member and spring-pressed against said stationary member, said spring-pressed member having a part engaging that arm of said bell-crank not bearing against said cam, and a spring acting between said first adjusting member and said spring-pressed member to insure engagement of said bell-crank with said cam.

8. In combination, an operating shaft for an adjustable device, two adjusting devices co-axial with each other, and cam means operated by one of said adjusting devices for adjusting said shaft circumferentially at a reduced angular speed relative to that of such adjusting device.

9. In combination, an operating shaft for an adjustable device, two adjusting devices co-axial with each other, each of said adjusting devices having an operating member, and cam-operated means operated by one of said operating members and acting between the other operating member and a stationary member to move said shaft circumferentially at a reduced circumferential speed relative to that of such operating member.

10. In combination, an operating shaft for an adjustable device, an adjusting member co-axial therewith, a rotatable member adapted to have a frictional bearing on a stationary member, and cam-operated means operated by said adjusting member and acting between said rotatable member and said shaft to adjust the latter circumferentially at a reduced angular speed relative to that of said adjusting member.

11. In combination, an operating shaft for an adjustable device, two adjusting devices co-axial with each other, a rotatable member adapted to have a frictional bearing on a stationary member, a cam operated by one of said operating members, means operated by said cam and acting between the other operating member and said rotatable member to drive said shaft at a reduced speed relative to that of the adjusting member which operates said cam.

12. In combination, an operating shaft for an adjustable device, a member fixed to said shaft for adjusting it, a second adjusting member co-axial with said shaft and capable of rotation relative thereto, said second adjusting member being provided with a spiral cam, and a bell-crank pivoted on said first adjusting member and having one of its arms arranged to engage said cam, and a member having a frictional drag on its movements tending to hold it stationary, said member being arranged to provide a fulcrum at the end of the other arm of said bell-crank.

13. Mechanism for adjusting a movable element in relation to a fixed element primarily by an approximate adjustment and then by a vernier adjustment, comprising a driving member, means carried thereby for indirectly coupling said driving member to the movable element during the approximate adjustment of the latter, a lever plate adapted to be rotated by said means during such adjustment, a friction plate mounted to rotate with said lever plate during the approximate adjustment, but to remain stationary and act as a fulcrum for said lever plate for the vernier adjustment of the movable element.

14. Mechanism for adjusting a movable element in relation to a fixed element including a driving member adapted to move the movable element therewith to give an approximate adjustment of the latter with relation to the fixed element, and means, on the reversal of the driving element, for automatically varying the leverage between said driving and movable elements, so that relatively large movement of the driving element causes relatively small movement of the movable element.

15. Mechanism for adjusting a movable element in relation to a fixed element primarily by an approximate adjustment and then by a vernier adjustment, comprising a lever plate adapted to be coupled with the movable element, a friction plate, means for coupling said friction plate to and moving it with the lever plate during the approximate adjustment and for causing it to remain stationary and act as a fulcrum to said lever plate during the vernier adjustment, and lever plate operating means rotatable in one direction to bring into play said approximate adjustment and in the opposite direction to bring into play the vernier adjustment.

16. Mechanism for adjusting a movable element in relation to a fixed element primarily by an approximate adjustment and then by a vernier adjustment, comprising a lever plate adapted to be coupled with the movable element, a friction plate, means for coupling said friction plate to and moving it with the lever plate during the approximate adjustment and for causing it to remain stationary and act as a fulcrum to said lever plate during the vernier adjustment, and lever plate operating means rotatable in one direction to bring into play said coarse adjustment and in the opposite direction to bring into play said vernier adjustment, said operating means comprising the usual operating knob or handle with which the mechanism is provided.

17. Mechanism for adjusting a movable element in relation to a fixed element primarily by an approximate adjustment and then by a vernier adjustment, comprising a lever plate adapted to be coupled with the movable element, a friction plate, means for coupling said friction plate to and moving it with the lever plate during the approximate adjustment and for causing it to remain stationary and act as a fulcrum for said lever plate during the vernier adjustment, lever plate operating means rotatable in one direction to bring into play said coarse adjustment and in the opposite direction to bring into play said vernier adjustment, said operating means comprising the usual operating knob or handle with which the mechanism is provided, and whereby either a forward or backward vernier adjustment may be effected at will.

18. A vernier for a rotatably adjustable shaft comprising, in combination, a unitary manually movable control means for obtaining both coarse and fine adjustment of said shaft, a rigid element rigidly connected to said shaft and having dial markings thereon for indicating the amount of movement of said shaft, coupling elements carried directly by said control means and said rigid element respectively and effective through one range of movement of said control means to directly connect said control means and said rigid element for movement of the latter by the former, and movement-transmitting means between said control means and said rigid element effective only through another range of movement from the control means to transmit movement from the control means to said rigid element at a reduced ratio or extent of movement of the latter, said direct connecting means operating wholly independently of said motion reduction means.

19. A vernier for a rotatably adjustable shaft comprising, in combination, a unitary control means manually movable about an axis concentric with said shaft for obtaining both coarse and fine adjustment thereof, a dial member for measuring the movement of said shaft, means forming a rigid connection between said shaft and said dial member, said control means and said dial member being relatively arranged for movement of the former independently of the latter through a limited arc for fine adjustments, means associated with both providing a direct connection there-between upon movement of said control means in either direction beyond said limited arc for coarse adjustments, and means permitting a differential movement of said shaft relative to said control means for the fine adjustments, said differential means including a crank revolving about an axis parallel to said shaft and having an operative bearing on said dial member turning the same about its axis, a friction element for maintaining a fixed position for the free end of the crank throughout the differential movement, and means operated by movement of said control means in its said limited arc for turning said crank.

In witness whereof, I have hereunto set my hand at Indianapolis, Indiana, this 15th day of November, A. D. one thousand nine hundred and twenty-two.

CHARLES R. BUTLER.